(12) United States Patent
Nguyen et al.

(10) Patent No.: US 6,744,597 B2
(45) Date of Patent: *Jun. 1, 2004

(54) DYNAMIC ABSORBER FOR AN ACTUATOR ARM IN A DISK DRIVE

(75) Inventors: Tu Nguyen, San Jose, CA (US); Haeng Soo Lee, Santa Clara, CA (US); Woo-Sung Kim, Santa Clara, CA (US)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 112 days.

(21) Appl. No.: 09/430,463

(22) Filed: Oct. 29, 1999

(65) Prior Publication Data

US 2001/0022706 A1 Sep. 20, 2001

(51) Int. Cl.[7] .............................................. G11B 17/32
(52) U.S. Cl. ..................................................... 360/234.5
(58) Field of Search ........................... 360/234.5, 234.6, 360/244.2, 245.6, 245.7, 245.8, 97.01, 97.02, 97.03, 265, 265.1

(56) References Cited

U.S. PATENT DOCUMENTS

| | | |
|---|---|---|
| 3,558,831 A | 1/1971 | Prescott et al. |
| 4,110,802 A | 8/1978 | Ho et al. |
| 4,280,156 A | 7/1981 | Villette |
| 4,493,554 A | 1/1985 | Pryor et al. |
| 4,555,739 A | 11/1985 | Le Van et al. |
| 4,562,500 A | 12/1985 | Bygdnes |
| 4,630,926 A | 12/1986 | Tanaka et al. |
| 4,661,873 A | 4/1987 | Schulze |
| 4,673,996 A | 6/1987 | White |
| 4,703,376 A | 10/1987 | Edwards et al. |
| 4,731,777 A | 3/1988 | Yoshitoshi et al. |
| 4,739,425 A | 4/1988 | Dierkes et al. |
| 4,784,012 A | 11/1988 | Marra |
| 4,794,588 A | 12/1988 | Yoshitoshi et al. |
| 4,802,042 A | 1/1989 | Strom |

(List continued on next page.)

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| FR | 2518-791 A | 6/1983 |
| GB | 2 050 670 A | 1/1981 |
| GB | 2 100052 A | 12/1982 |
| GB | 2 326 755 A | 12/1998 |
| JP | 632 344 55 | 9/1988 |
| JP | 3-83281 | 4/1991 |
| JP | 3-104079 | 5/1991 |
| JP | 09251769 A | 9/1997 |
| JP | 9-293370 | 11/1997 |
| WO | WO 93/10494 | 5/1993 |
| WO | WO 96/34390 | 10/1996 |

OTHER PUBLICATIONS

US 6,091,569, 7/2000, Allsup et al. (withdrawn)*

*Primary Examiner*—Allen Cao
(74) *Attorney, Agent, or Firm*—Irell & Manella LLP; Jeffrey P. Aiello

(57) ABSTRACT

An actuator beam that can be incorporated into an actuator arm assembly of a hard disk drive. The actuator beam may include a dynamic absorber that extends from a distal end of the beam. The dynamic absorber may attenuate any resonant displacement in the actuator beam induced by a shock load that is applied to the hard disk drive.

27 Claims, 3 Drawing Sheets

U.S. PATENT DOCUMENTS

| | | | |
|---|---|---|---|
| 4,819,094 A * | 4/1989 | Oberg | 360/245.9 |
| 4,819,105 A | 4/1989 | Edwards | |
| 4,839,756 A | 6/1989 | Chew et al. | |
| 4,866,553 A | 9/1989 | Kubo et al. | |
| 4,870,519 A | 9/1989 | White | |
| 4,890,172 A | 12/1989 | Watt et al. | |
| 4,949,206 A | 8/1990 | Phillips et al. | |
| 4,958,337 A | 9/1990 | Yamanaka et al. | |
| 4,982,300 A * | 1/1991 | Forbord | 360/264.7 |
| 5,004,207 A | 4/1991 | Ishikawa et al. | |
| 5,021,905 A | 6/1991 | Sleger | |
| 5,029,026 A | 7/1991 | Stefansky et al. | |
| 5,062,017 A | 10/1991 | Strom et al. | |
| 5,097,370 A | 3/1992 | Hsia | |
| 5,128,822 A | 7/1992 | Chapin et al. | |
| 5,130,870 A | 7/1992 | Jabbari | |
| 5,159,508 A | 10/1992 | Grill et al. | |
| 5,161,900 A | 11/1992 | Bougathou et al. | |
| 5,167,167 A | 12/1992 | Tiernan, Jr. et al. | |
| 5,175,661 A | 12/1992 | Mizuno et al. | |
| 5,187,621 A | 2/1993 | Tacklind | |
| 5,200,868 A | 4/1993 | Chapin et al. | |
| 5,202,803 A | 4/1993 | Albrecht et al. | |
| 5,204,793 A * | 4/1993 | Plonczak | 360/97.01 |
| 5,214,549 A | 5/1993 | Baker et al. | |
| 5,241,438 A | 8/1993 | Matsushima | |
| 5,243,495 A | 9/1993 | Read et al. | |
| 5,247,493 A | 9/1993 | Kime et al. | |
| 5,262,911 A | 11/1993 | Cain et al. | |
| 5,262,913 A | 11/1993 | Stram et al. | |
| 5,267,109 A | 11/1993 | Chapin et al. | |
| 5,274,519 A | 12/1993 | Saito et al. | |
| 5,287,235 A | 2/1994 | Cunningham et al. | |
| 5,293,282 A | 3/1994 | Squires et al. | |
| 5,309,303 A | 5/1994 | Hsia et al. | |
| 5,319,511 A | 6/1994 | Lin | |
| 5,343,343 A | 8/1994 | Chapin | |
| 5,347,414 A | 9/1994 | Kano | |
| 5,365,389 A | 11/1994 | Jabbari et al. | |
| 5,369,538 A | 11/1994 | Moe et al. | |
| 5,396,386 A | 3/1995 | Bolasna et al. | |
| 5,396,387 A | 3/1995 | Murray | |
| 5,402,290 A | 3/1995 | Daniel | |
| 5,404,256 A | 4/1995 | White | |
| 5,410,402 A | 4/1995 | Li et al. | |
| 5,422,776 A | 6/1995 | Thorson et al. | |
| 5,426,562 A | 6/1995 | Morehouse et al. | |
| 5,442,638 A | 8/1995 | Awad et al. | |
| 5,455,728 A | 10/1995 | Edwards et al. | |
| 5,460,017 A | 10/1995 | Taylor | |
| 5,463,527 A | 10/1995 | Hager et al. | |
| 5,469,311 A | 11/1995 | Nishida et al. | |
| 5,537,272 A | 7/1996 | Kazmierczak et al. | |
| 5,546,250 A | 8/1996 | Diel | |
| 5,555,144 A | 9/1996 | Wood et al. | |
| 5,570,249 A | 10/1996 | Aoyagi et al. | |
| 5,610,776 A | 3/1997 | Oh | |
| 5,636,090 A | 6/1997 | Boigenzahn et al. | |
| 5,663,853 A | 9/1997 | Park | |
| 5,673,158 A | 9/1997 | Ichimura | |
| 5,677,813 A | 10/1997 | Yoshida et al. | |
| 5,703,734 A | 12/1997 | Berberich et al. | |
| 5,754,353 A | 5/1998 | Behrens et al. | |
| 5,768,249 A | 6/1998 | Ro et al. | |
| 5,781,373 A | 7/1998 | Larson et al. | |
| 5,801,899 A | 9/1998 | Genheimer | |
| 5,808,837 A * | 9/1998 | Norton | 360/254.3 |
| 5,815,349 A | 9/1998 | Frater | |
| 5,822,139 A | 10/1998 | Ayabe | |
| 5,831,795 A | 11/1998 | Ma et al. | |
| 5,844,754 A | 12/1998 | Stefansky et al. | |
| 5,844,911 A | 12/1998 | Schadegg et al. | |
| 5,875,067 A | 2/1999 | Morris et al. | |
| 5,885,005 A | 3/1999 | Nakano et al. | |
| 5,886,851 A | 3/1999 | Yamazaki et al. | |
| 5,901,017 A * | 5/1999 | Sano et al. | 360/234.5 |
| 5,926,347 A | 7/1999 | Kouhei et al. | |
| 5,930,079 A | 7/1999 | Vera et al. | |
| 5,930,080 A | 7/1999 | Frater et al. | |
| 5,936,927 A | 8/1999 | Soga et al. | |
| 5,969,901 A | 10/1999 | Eckberg et al. | |
| 5,987,733 A * | 11/1999 | Goss | 360/245.7 |
| 6,011,670 A | 1/2000 | Balsley, Jr. et al. | |
| 6,034,941 A | 3/2000 | Ro | |
| 6,046,883 A * | 4/2000 | Miller | 360/245.7 |
| 6,055,134 A | 4/2000 | Boutaghou | |
| 6,084,744 A * | 7/2000 | Genheimer et al. | 360/97.02 |
| 6,088,192 A | 7/2000 | Riener et al. | |
| 6,088,194 A | 7/2000 | Imaino et al. | |
| 6,088,202 A * | 7/2000 | Kabasawa et al. | 360/245.7 |
| 6,091,576 A | 7/2000 | Eckerd et al. | |
| 6,115,214 A | 9/2000 | Allsup et al. | |
| 6,128,164 A * | 10/2000 | Kant et al. | 360/244.5 |
| 6,154,360 A | 11/2000 | Kaczeus, Sr. et al. | |
| 6,157,522 A | 12/2000 | Murphy et al. | |
| 6,166,901 A | 12/2000 | Gamble et al. | |
| 6,185,075 B1 | 2/2001 | Tsujino et al. | |
| 6,185,807 B1 | 2/2001 | Kazmierczak et al. | |
| 6,198,606 B1 | 3/2001 | Boutaghou et al. | |
| 6,201,668 B1 | 3/2001 | Murphy | |
| 6,205,005 B1 | 3/2001 | Heath | |
| 6,212,029 B1 | 4/2001 | Fioravanti | |
| 6,212,043 B1 * | 4/2001 | Nakamura et al. | 360/244.3 |
| 6,226,143 B1 | 5/2001 | Stefanksy | |
| 6,226,145 B1 | 5/2001 | Genheimer et al. | |
| 6,226,152 B1 | 5/2001 | Tanaka et al. | |
| 6,229,668 B1 | 5/2001 | Huynh et al. | |
| 6,233,124 B1 | 5/2001 | Budde et al. | |
| 6,236,531 B1 | 5/2001 | Allsup et al. | |
| 6,239,943 B1 | 5/2001 | Jennings et al. | |
| 6,252,745 B1 * | 6/2001 | McReynolds et al. | 360/265.1 |
| 6,271,996 B1 * | 8/2001 | Houk et al. | 360/244.9 |
| 6,437,948 B1 * | 8/2002 | Sugimoto | 360/294.7 |
| 6,498,700 B2 * | 12/2002 | Takahashi et al. | 360/97.01 |
| 6,585,902 B1 * | 7/2003 | Shum et al. | 360/137 |
| 6,594,114 B1 * | 7/2003 | Suzuki et al. | 360/244.3 |

* cited by examiner

DYNAMIC ABSORBER FOR AN ACTUATOR ARM IN A DISK DRIVE

BACKGROUND OF THE INVENTION

1. Field of the Invention

The present invention relates to a dynamic absorber that extends from an actuator arm for a hard disk drive.

2. Background Information

Hard disk drives contain a plurality of heads that are each coupled to a surface of a rotating disk. Hard disk drives typically contain a number of disks that are assembled to a single spindle motor. Each head may contain a write element for magnetizing the disk surface and a read element for sensing the magnetic field of the disk surface to store and retrieve binary information as is well known in the art.

Each head is typically gimbal mounted to a suspension arm which is attached to an actuator beam of an actuator arm. The arms suspend the heads adjacent to the surfaces of the disks. The heads each have air bearing surfaces which cooperate with an air flow generated by the rotating disks to create an air bearing between the head and the disk surface. The air bearing minimizes the contact and mechanical wear between the head and the disk. It is desirable to provide an air bearing that is large enough to minimize mechanical wear while being small enough to optimize the magnetic coupling between the head and the disk surface. A head and suspension arm are commonly referred to as a head gimbal assembly (HGA).

The data is typically stored within a plurality of annular tracks that extend radially across a disk surface. Each track may contain a plurality of sectors that each contain a block of data along with servo bits and other information required to operate the drive. The actuator arm has a voice coil that is coupled to a magnet assembly of the disk drive. The voice coil and magnet assembly are commonly referred to as a voice coil motor (VCM). The voice coil motor can be excited to create a torque that swings the actuator arm and moves the heads across the surfaces of the disks. Movement of the actuator arm allows the heads to access the different tracks of the disks. Rotation of the disks allows the heads to access the different sectors of the tracks.

Disk drives can be subjected to shock loads which create a resonant displacement of the heads relative to the disk surfaces. The resonant displacement may create an error in writing or reading data. FIGS. 1 and 2 show the shock load and the lateral displacement at the end of an actuator beam, respectively, for a disk drive of the prior art. The lateral displacement is in a plane that is essentially parallel with the surface of the disk. As shown in FIG. 2, the shock load creates resonant displacement which moves the head relative to the disk. This movement may create an error in writing or reading data.

It is desirable to provide an actuator assembly that will dampen the shock load and minimize the amount of resonant displacement of the heads. There have been developed actuator arms which include a layer of damping material located on each surface of the actuator beams. This design does not sufficiently dampen shock loads transmitted into the actuator arm. It would be desirable to provide an actuator arm that dampens a shock load applied to the arm more effectively than designs of the prior art. It would also be desirable to provide such an actuator arm without significantly increasing the cost of constructing the arm.

SUMMARY OF THE INVENTION

One embodiment of the present invention is an actuator beam that can be incorporated into an actuator arm assembly of a hard disk drive. The actuator beam may include a dynamic absorber that extends from a distal end of the beam. The dynamic absorber may attenuate any resonant displacement in the actuator beam induced by a shock load that is applied to the hard disk drive.

DETAILED DESCRIPTION

Figure 3:
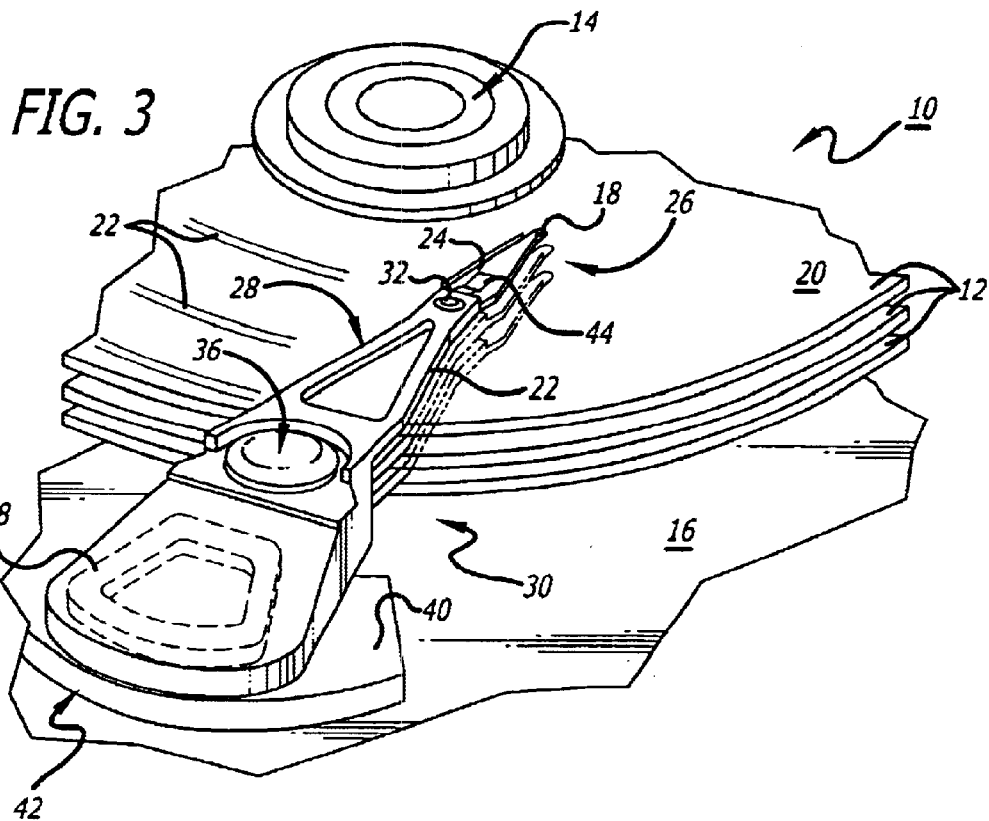
FIG. 3 is a perspective view of a hard disk drive of the present invention.
Figure 4:
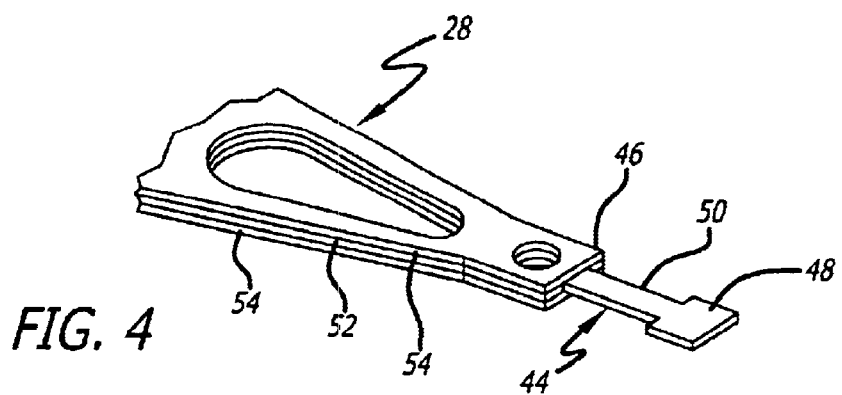
FIG. 4 is a sectional perspective view showing a dynamic absorber that extends from an actuator beam.
Figure 5:
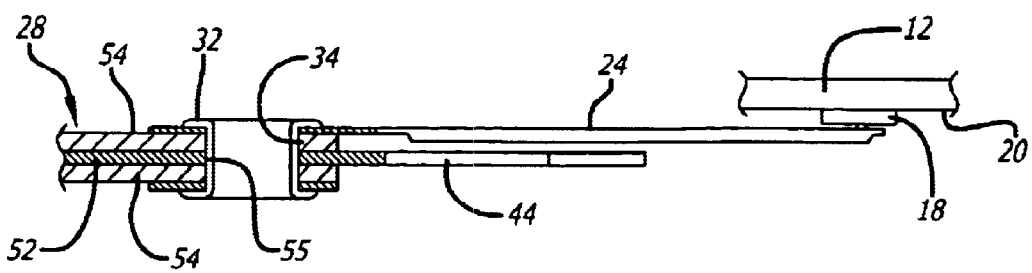
FIG. 5 is a side sectional view of an actuator beam of the disk drive.

Referring to the drawings more particularly by reference numbers, FIGS. 3, 4 and 5 show an embodiment of a hard disk drive 10 of the present invention. The disk drive 10 may include a plurality of disks 12 that are rotated by a spindle motor 14. The spindle motor 14 is mounted to a base plate 16. The disk drive 10 may further have a plurality of heads 18 that are each magnetically coupled to a surface 20 of a disk 12. Each head 18 may include a write element (not shown) and a read element (not shown). The write and read elements are connected to electrical circuits (not shown) to magnetize and sense the magnetic fields of the disk surfacs 20 to store and retrieve binary information as is known in the art. Data is typically stored within annular tracks 22 that extend radially across the disk surfaces 20. Each track 22 typically contains a plurality of sectors which each contain one or more blocks of data.

Each head 18 may also have an air bearing surface which cooperates with an air flow generated by the rotating disks 12 to create an air bearing between the head 18 and the adjacent disk surface 20. The air bearing minimizes mechanical wear between the head 18 and the disk 12.

Each head 18 is typically gimbal mounted to a suspension arm 24. A head and arm 24 are commonly referred to as a head gimbal assembly 26 (HGA). Each suspension arm 24 may be attached to an actuator beam 28 of an actuator arm 30. The suspension arms 24 are typically attached to the actuator beams 28 by swage plates 32 that are swaged into swage openings 34 of the beams 28. The arms 24 and beams 28 suspend the heads 18 adjacent to the disk surfaces 20.

The actuator arm 24 may be pivotally mounted to the base plate 16 by a bearing assembly 36. The bearing assembly 36 allows the arm 24 to rotate relative to the base plate 16 so that the heads 18 can move across the surfaces of the disks 12 to access data within the different annular tracks 22. The actuator arm 24 may include a voice coil 38 that is coupled to a magnet assembly 40 which is mounted to the base plate 16. The voice coil 38 and magnet assembly 40 are commonly referred to as a voice coil motor 42 (VCM). The voice coil 38 may be connected to electrical circuits (not shown) which can excite the VCM 42 to generate a torque that rotates the actuator arm 24. Rotation of the actuator arm 24 moves the heads 18 across the disk surfaces 20.

One or more of the actuator beams 28 may include a dynamic absorber 44 which extends from a distal end 46 of the beam 28. The dynamic absorber 44 may include a mass portion 48 that is located at the end of a beam portion 50. The mass 48 and beam 50 portions provide mass and spring elements that will modify the natural resonant frequency of the actuator beam 28.

The dynamic absorber 44 may be constructed from a damping material that can absorb energy transmitted into the actuator beam 28. By way of example, the damping material may be a molded ABS plastic material. The dynamic absorber 44 may extend from a layer of damping material 52 that is sandwiched between two metal layers 54 of the beam to create a composite structure. The additional layer of damping material 52 can further modify the natural resonant frequency of the beam 28. The damping layer 52 may also have a swage opening 55 to allow the suspension arm 24 to be swaged to the actuator beam 28.

The composite actuator beam 28 can be constructed by initially forming the layer of damping material 52 and the dynamic absorber 44 as an integrally molded part. The layer of damping material 52 can then be attached to the metal layers 54 with an adhesive or other means.

Figure 1:
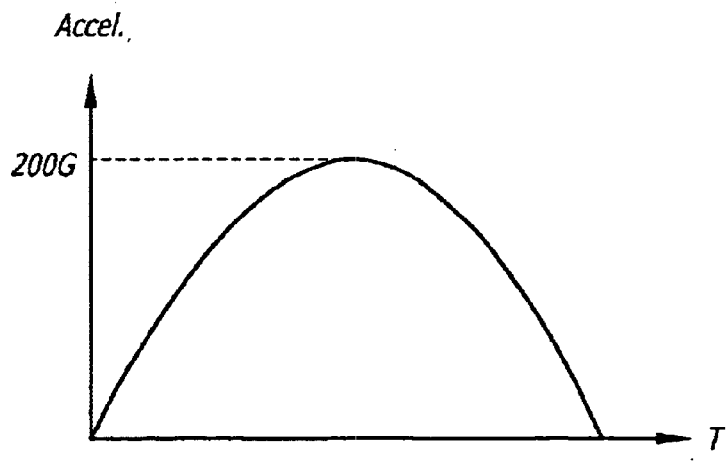
FIG. 1 is a graph showing a shock load that can be applied to a disk drive.
Figure 2:
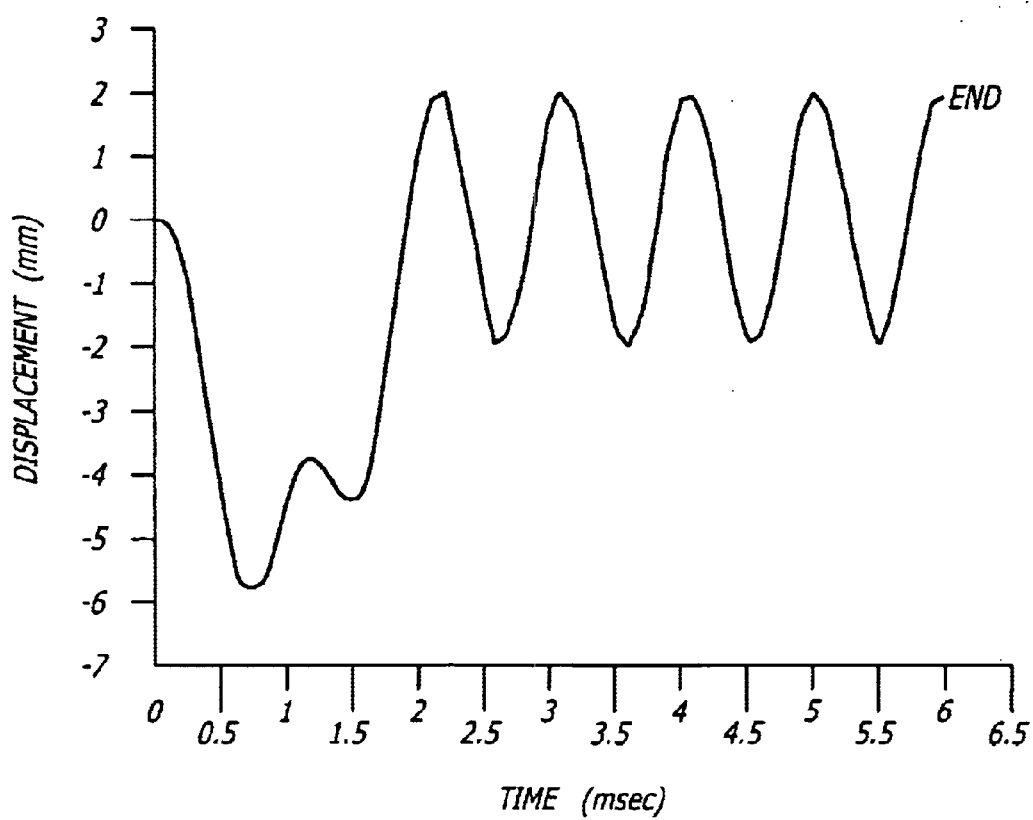
FIG. 2 is a graph showing a displacement of an actuator beam in response to the shock load of FIG. 1 for a disk drive of the prior art.
Figure 6:
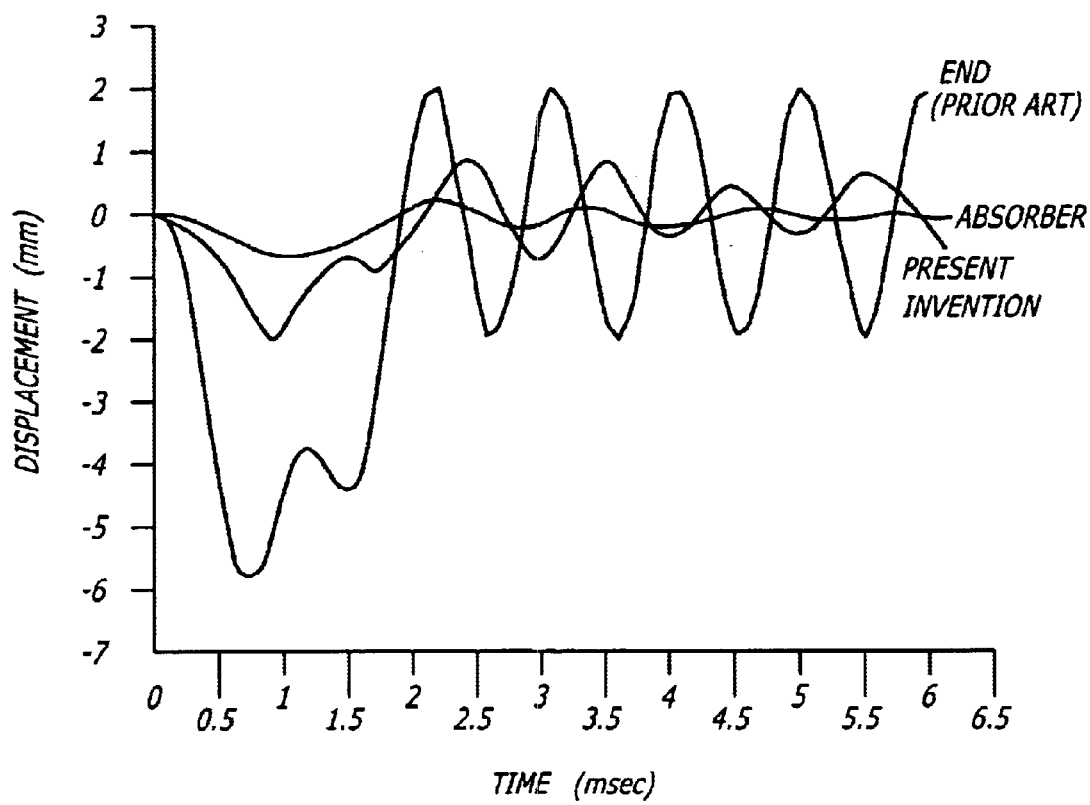
FIG. 6 is a graph showing a displacement of an actuator beam and a damping material in response to the shock load shown in FIG. 1.

The disk drive 10 may be subjected to a shock load which is transmitted to the actuator beam 28. FIG. 6 shows a simulated lateral displacement of the end of the actuator beam 28 and the mass portion 50 of the dynamic absorber 44 in response to the shock load shown in FIG. 1, using a finite element analysis. The displacement for a prior art actuator beam without damping material as shown in FIG. 2, is superimposed for comparative purposes. As shown by FIG. 6, the dynamic absorber 44 attenuates the amplitude of the resonant lateral displacement of the actuator beam 28. The dynamic absorber 44 of the present invention modifies the natural frequency of the actuator beam 28 and absorbs energy to attenuate the amplitude of the beam displacement and minimize the movement of the head 18 when the disk drive 10 is subjected to a shock load.

The dynamic absorber 44 provides a damping solution which does not significantly increase the cost of the disk drive 10. When used in a multiple disk drive as shown, the dynamic absorber 44 may be attached to actuator beams 28 that do not normally have two HGAs attached to the beams 28. By way of example, the dynamic absorbers 44 may be attached to the top and bottom actuator beams 28 of a multiple disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An actuator beam for an actuator arm that is attached to a suspension arm and rotates relative to a base plate of a hard disk drive, comprising:
    a beam which has a distal end; and,
    a dynamic absorber that extends from said distal end of said beam and absorbs energy transmitted to said beam.

2. The actuator beam of claim 1, wherein said dynamic absorber is constructed from a damping material.

3. The actuator beam of claim 1, wherein said dynamic absorber includes a mass portion that is located at an end of a beam portion.

4. The actuator beam of claim 1, wherein said dynamic absorber extends from a layer of damping material that is located between a pair of metal layers to form a composite structure.

5. An actuator arm assembly that rotates relative to a base plate of a hard disk drive, comprising:
    an actuator arm which has an actuator beam, said actuator beam includes a dynamic absorber which extends from a distal end of said actuator beam and absorbs energy transmitted to said beam;
    a voice coil attached to said actuator arm; and,
    a head gimbal assembly attached to said actuator beam.

6. The actuator arm assembly of claim 5, wherein said dynamic absorber is constructed from a damping material.

7. The actuator arm assembly of claim 5, wherein said dynamic absorber includes a mass portion that is located at an end of a beam portion.

8. The actuator arm assembly of claim 5, wherein said dynamic absorber extends from a layer of damping material that is located between a pair of metal layers to form a composite structure.

9. A hard disk drive, comprising:
    a base plate;
    a spindle motor mounted to said base plate;
    a disk that is rotated by said spindle motor;
    a head gimbal assembly that is coupled to said disk;
    an actuator arm that rotates relative to said base plate and which has an actuator beam that is attached to said head gimbal assembly, said actuator beam having a dynamic absorber that extends from a distal end of said actuator beam and absorbs energy transmitted to said beam; and,
    a voice coil attached to said actuator arm.

10. The hard disk drive of claim 9, wherein said dynamic absorber is constructed from a damping material.

11. The hard disk drive of claim 9, wherein said dynamic absorber includes a mass portion that is located at an end of a beam portion.

12. The hard disk drive of claim 9, wherein said dynamic absorber extends from a layer of damping material that is located between a pair of metal layers to form a composite structure.

13. An actuator beam for an actuator arm of a hard disk drive, comprising:
    a beam which has a distal end; and,
    a dynamic absorber that extends from said distal end of said beam, said dynamic absorber extends from a layer of damping material that is attached to a metal layer of said beam.

14. The actuator beam of claim 13, wherein said dynamic absorber is constructed from a damping material.

15. The actuator beam of claim 13, wherein said dynamic absorber includes a mass portion that is located at an end of a beam portion.

16. The actuator beam of claim 13, wherein said dynamic absorber that is located between a pair of metal layers to form a composite structure.

17. An actuator arm assembly for a hard disk drive, comprising:
    an actuator arm which has an actuator beam, said actuator beam includes a dynamic absorber which extends from a layer of damping material that is attached to a metal layer of said actuator beam;
    a voice coil attached to said actuator arm; and,
    a head gimbal assembly attached to said actuator beam.

18. The actuator arm assembly of claim 17, wherein said dynamic absorber is constructed from a damping material.

19. The actuator arm assembly of claim 17, wherein said dynamic absorber includes a mass portion that is located at an end of a beam portion.

20. The actuator arm assembly of claim 17, wherein said dynamic absorber is located between a pair of metal layers to form a composite structure.

21. A hard disk drive, comprising:

a base plate;

a spindle motor mounted to said base plate;

a disk that is rotated by said spindle motor;

a head gimbal assembly that is coupled to said disk;

an actuator arm which has an actuator beam that is attached to said head gimbal assembly, said actuator beam having a dynamic absorber that extends from a layer of damping material that is attached to a metal layer of said actuator beam; and, a voice coil attached to said actuator arm.

22. The hard disk drive of claim 21, wherein said dynamic absorber is constructed from a damping material.

23. The hard disk drive of claim 21, wherein said dynamic absorber includes a mass portion that is located at an end of a beam portion.

24. The hard disk drive of claim 21, wherein said dynamic absorber that is located between a pair of metal layers to form a composite structure.

25. The actuator beam of claim 1, wherein said dynamic absorber is constructed from a molded ABS plastic material.

26. The actuator beam of claim 1, wherein said dynamic absorber is to modify a natural resonant frequency of the beam.

27. The actuator arm assembly of claim 5, wherein said dynamic absorber is to limit the movement of said head gimbal assembly by absorbing energy when said hard disk drive is subjected to a shock load.

* * * * *